United States Patent [19]
Suzuki

[11] Patent Number: 6,128,572
[45] Date of Patent: Oct. 3, 2000

[54] VEHICLE DIRECTION CORRECTING APPARATUS

[75] Inventor: Takayoshi Suzuki, Tokyo, Japan

[73] Assignee: Clarion Co., Ltd., Tokyo, Japan

[21] Appl. No.: 09/132,234

[22] Filed: Aug. 11, 1998

[30] Foreign Application Priority Data

Sep. 4, 1997 [JP] Japan ..................... 9-254108

[51] Int. Cl.[7] .................................................. G01C 21/06
[52] U.S. Cl. ............................ 701/207; 701/217; 702/92
[58] Field of Search .................................... 701/207, 217, 701/220, 221; 702/92, 95, 94, 150, 151; 342/357.14, 357.02, 357.03

[56] References Cited

U.S. PATENT DOCUMENTS 3,074,699  1/1963  Morris et al. ........................ 73/865.9
5,617,320  4/1997  Petersen et al. ...................... 701/220

FOREIGN PATENT DOCUMENTS 7-55491   3/1995  Japan .
7-146148  6/1995  Japan .
7-324941  12/1995 Japan .
8-114455  5/1996  Japan .
9-229697  9/1997  Japan .
10-19585  1/1998  Japan .

*Primary Examiner*—Tan Nguyen
*Attorney, Agent, or Firm*—McGinn & Gibb, P.C.

[57] ABSTRACT

A vehicle direction correcting apparatus comprises: a first filter for passing therethrough a low frequency component contained in the output voltage of a relative direction detecting unit to thereby produce a first output voltage; a second filter having delay time different from that of the first filter, for passing therethrough a low frequency component contained in the output voltage of the relative direction detecting unit to thereby produce a second output voltage; a voltage judging unit for judging as to whether or not the first output voltage of the first filter is made coincident with the second output voltage of the second filter within a predetermined error range; and a control unit for setting an output voltage of the relative direction detecting unit as the central point potential in the case that the voltage judging unit judges that the first output voltage is made coincident with the second output voltage within the predetermined error range. As a result, the vehicle direction correcting apparatus can correct the output voltage of the relative direction detecting unit based upon this central point potential in the output voltage of the relative direction detecting unit for detecting direction of the vehicle in such a manner that the drift error contained in the output voltage is eliminated.

9 Claims, 5 Drawing Sheets

FIG. 3A

| INPUT | Dclr |
|---|---|
| Adif > REFa | HIGH LEVEL |
| Adif ≤ REFa | LOW LEVEL |

ANALOG COMPARATOR 35

FIG. 3B

| Dclr | Dck | Dcnt |
|---|---|---|
| H | × | ○ |
| L | ⎍ | (INCREMENT) |

COUNTER 37

FIG. 3C

| INPUT | Dstbl |
|---|---|
| Dcnt > REFd | H |
| Dcnt ≤ REFd | L |

DIGITAL COMPARATOR 38

FIG. 3D

| Dstbl | Dnull |
|---|---|
| H | Ddly |
| L | (HOLD) |

LATCH CIRCUIT 40

VEHICLE DIRECTION CORRECTING APPARATUS

BACKGROUND OF THE INVENTION

The present invention is related to a vehicle direction correcting apparatus for correcting a measurement error of a vehicle direction detected by a relative direction detecting means such as an angular velocity sensor used in a navigation system for a vehicle, namely for correcting the measurement error in such a manner that a drift error is eliminated.

Conventionally, as the angular velocity sensor used in such a vehicle navigation system, such an angular velocity sensor is employed to detect a change in vehicle direction, and a position of the own vehicle is displayed on a map under representation based on this direction change detection result, so that a driver of this vehicle may recognize drive (travel) direction of the own vehicle.

In such a case that the vehicle direction is not changed, for instance, while the vehicle is stopped, or driven along a straight path, an output voltage of an angular velocity sensor must become zero. However, a drift error happens to occur due to adverse influences caused by temperatures and humidity. As a result, the output voltage of this sensor cannot become completely zero, because of this drift error. That is, the central (neutral) point potential which is a reference voltage of the angular velocity sensor could not become completely zero.

To avoid this problem, the vehicle direction correcting apparatus has been proposed by which the sensor output voltage of the angular velocity sensor is corrected so as to eliminate the drift error contained in this sensor output voltage.

In this vehicle direction correcting apparatus, a detection is made of such a condition that there is no change in the vehicle direction, for instance, while the vehicle is stopped, or driven along the straight path. Then, the output voltage of the angular velocity sensor obtained under this condition is set to the central point potential. In other words, since the central point potential of this angular velocity sensor is not set to a constant, but is variable, this conventional vehicle direction correcting apparatus can correct the sensor output voltage in such a manner that the drift error contained in the sensor output voltage of this angular velocity sensor is eliminated.

Therefore, in such a vehicle direction correcting apparatus, since it is required to detect such a condition that the vehicle is stopped, or driven along the straight path, various detecting methods have been employed with use of the GPS system, the CD-ROM, and the vehicle speed sensor employed in the navigation system.

In case of that the GPS system of this navigation system is used, it is possible to detect such a condition that the vehicle is stopped, or driven along the straight path based upon the direction information acquired from the GPS satellite.

Also, in case of that the CD-ROM of the navigation system is used, when the road on which the vehicle is presently driven can be recognized as the straight road on the map by performing the map matching process based on the map data saved on this CD-ROM, it is possible to detect such a condition that the vehicle is driven along the straight road.

Also, in case of that the vehicle speed sensor of the navigation system is used, the occurrence frequency of the vehicle speed pulse corresponding to the speed change amount of the vehicle derived from this vehicle speed sensor is monitored. Then, it is possible to firmly detect such a condition that the vehicle is stopped based upon this occurrence frequency.

Next, the vehicle direction correcting apparatus with using the vehicle speed sensor will now be explained. FIG. 5 is a timing chart for showing the operations of the conventional vehicle direction correcting apparatus for producing the central point potential of the angular velocity sensor by using the vehicle speed sensor.

In such a conventional vehicle direction correcting apparatus, as indicated in FIG. 5, the stop detecting time period "X" defined by a constant time duration in the vehicle speed sensor so as to monitor the occurrence frequency of the vehicle speed pulse. When stopping of the occurrence of the vehicle speed pulse is detected during this stop detecting time period X, the output voltage of the angular velocity sensor outputted when the occurrence of the vehicle speed pulse is stopped during the correction time period "Z" after this stop detecting time period X is set to the central point potential.

As previously explained, according to the conventional vehicle direction correcting apparatus, for instance, such a condition that there is no change in the vehicle direction, e.g., while the vehicle is stopped, or driven along the straight path is detected. At this detection time, the output of the angular velocity sensor is set as the central point potential. In other words, since the central point potential of this angular velocity sensor is not made constant, but is variable, the output voltage of the angular velocity sensor can be corrected based on this central point potential in such a manner that the drift error contained in this sensor output voltage is eliminated.

However, in accordance with the above-explained conventional vehicle direction correcting apparatus, such a condition that the vehicle is stopped, or driven along the straight path is detected, so that the output of the angular velocity sensor is set as the central point potential. Then, the output voltage of the angular velocity sensor is corrected based on this central point potential in such a manner that the drift error contained in this sensor output voltage is eliminated. When such a condition that the vehicle is stopped, or traveled along the straight road is detected based upon the GPS direction information, the precision of the direction information is deteriorated because of the following reasons. For instance, since the vehicle is driven through the city, or the long-time drive stop condition more than 4 hours is continued, the satellite signal unreceivable condition is continued between the GPS satellites and the vehicle, so that no direction information could be acquired. As a result, there is such a first problem that the sensor output voltage could not be corrected in such a manner that the drift error of the angular velocity sensor is eliminated.

Also, in a case of that the vehicle is stopped is detected by executing the map matching process operation by the CD-ROM, since the precision of the map data recorded on this CD-ROM is limited, when the vehicle is traveled on a road which is not mapped on the map data, the travel direction of the vehicle cannot be recognized. As a result, there is such a second problem that the sensor output voltage could not be corrected in such a manner that the drift error of the angular velocity sensor is eliminated.

Further, in a case of that the vehicle being stopped is detected based upon the vehicle speed pulse derived from the vehicle speed sensor, the time period during which the vehicle is stopped is prolonged to some extent in order to accurate the detection while the vehicle is stopped. When such a sufficient detection time period cannot be secured, there is such a third problem that the sensor output voltage could not be corrected in such a manner that the drift error of the angular velocity sensor is eliminated.

In other words, according to such a conventional vehicle direction correcting apparatus, the output voltage of the angular velocity sensor derived while the vehicle is stopped, or traveled along the straight path is set as the central point potential. When the drift error contained in the output voltage derived from the angular velocity sensor is corrected based upon this central point potential, there is a fourth problem that various electric appliances belonging to the navigation system other than the angular velocity sensor, for instance, GPS, CD-ROM, and vehicle speed sensors should be utilized.

Also, according to the above-described conventional vehicle direction correcting apparatus, for example, when the vehicle is parked on a vehicle direction changing apparatus installed in a parking lot, such a special condition may occur. That is, the direction of this vehicle would be changed although the vehicle speed is 0 and the parking break is actuated. In this case, there is a fifth problem that the drift error contained in the output voltage derived from the angular velocity sensor is further increased.

SUMMARY OF THE INVENTION

The present invention has been made to solve the above-explained problems, and therefore, has an object to provide a vehicle direction correcting apparatus capable of surely correcting an output voltage of an angular velocity sensor in such a manner that a drift error contained in this output voltage can be eliminated without utilizing various devices employed in a navigation system other than the angular velocity sensor, and furthermore capable of surely recognizing actual direction of this vehicle.

To achieve the above-explained object, according to a first aspect of the present invention, a vehicle direction correcting apparatus corrects an output voltage of relative direction detecting means based upon a central point potential in the output voltage of the relative direction detecting means for detecting direction of a vehicle in such a manner that a drift error contained in the output voltage is eliminated. The vehicle direction correcting apparatus comprises: first filter means for passing therethrough a low frequency component contained in the output voltage of the relative direction detecting means to thereby produce a first output voltage; second filter means having delay time different from that of the first filter means, for passing therethrough a low frequency component contained in the output voltage of the relative direction detecting means to thereby produce a second output voltage; voltage judging means for judging as to whether or not the first output voltage of the first filter means is made coincident with the second output voltage of the second filter means within a predetermined error range; and control means for setting an output voltage of the relative direction detecting means as the central point potential in the case that the voltage judging means judges that the first output voltage is made coincident with the second output voltage within the predetermined error range.

The above-explained relative direction corresponds to a relative direction detecting unit for detecting drive direction of a vehicle based upon an acquired voltage, for example, an angular velocity sensor.

The above-described central point potential in the output voltage of the relative direction detecting means corresponds to a potential for constituting a reference used to correct the output voltage of this relative direction detecting means in such a manner that the drift error contained in this output voltage is eliminated.

The above-mentioned first filter means corresponds to, for example, an LPF for passing therethrough the low frequency component contained in the output voltage of the relative direction detecting means to thereby produce the first output voltage.

The second filter means corresponds to, for example, an LPF having delay time different from that of the first filter means, for passing therethrough the low frequency component contained in the output voltage of the relative direction detecting means to thereby produce the second output voltage.

The voltage judging means may judge as to whether or not the first output voltage of the first filter means is made coincident with the second output voltage of the second filter means. The voltage judging means is constituted by, for instance, a subtracter for subtracting the second output voltage from the first output voltage, and an analog comparator for judging as to whether or not a difference voltage obtained from this subtracter is lower than, or equal to a preselected voltage. When it is so judged that the difference voltage is lower than, or equal to this preselected voltage, the analog comparator judge that the first output voltage is made coincident with the second output voltage.

The above-explained control means corresponds to, for instance, a latch circuit and a CPU for setting an output voltage of the relative direction detecting means, corresponding to either the first output voltage or the second output voltage, as the central point potential in the case that the judging means judges that the first output voltage is made coincident with the second output voltage, and also for correcting the output voltage of the relative direction detecting means based on this control point voltage in such a manner that the drift error contained in this output voltage is eliminated.

As a consequence, in accordance with the vehicle direction correcting apparatus of the first aspect of the present invention, since the control means sets the output voltage of the relative direction detecting means as the central point potential in the case that the voltage judging means judges that the first output voltage is made coincident with the second output voltage within the predetermined error range, the vehicle direction correcting apparatus can correct the output voltage of the relative direction detecting means based upon the central point potential in the output voltage of the relative direction detecting means for detecting direction of the vehicle in such a manner that the drift error contained in the output voltage is eliminated. As a consequence, the output voltage derived from the relative direction detecting unit can be surely corrected by employing only this relative direction detecting unit in such a manner that the drift error contained in this output voltage can be eliminated without utilizing various appliances other than the angular velocity sensor corresponding to the relative direction detecting unit used in the navigation system, for example, the GPS, the vehicle speed sensor, and the CD-ROM. Furthermore, the actual vehicle drive direction can be surely recognized.

Also, according to a second aspect of the present invention, a vehicle direction correcting apparatus which corrects an output voltage of relative direction detecting means based upon a central point potential in the output voltage of the relative direction detecting means for detecting direction of a vehicle in such a manner that a drift error contained in the output voltage is eliminated. The vehicle direction correcting apparatus comprises: first filter means for passing therethrough a low frequency component contained in the output voltage of the relative direction detecting means to thereby produce a first output voltage; second filter means having delay time different from that of the first filter means, for passing therethrough a low frequency component contained in the output voltage of the relative direction detecting means to thereby produce a second output voltage; voltage judging means for judging as to whether or not the first output voltage of the first filter means is made coincident with the second output voltage of the second filter means within a predetermined error range; and control means for setting an output voltage of the relative direction detecting means as the central point potential in the case that the voltage judging means continuously judges that the first output voltage is made coincident with the second output voltage within the predetermined error range during a time duration longer than predetermined time.

It should be noted that as to the arrangement of the vehicle direction correcting apparatus according to the second aspect, overlapped with that of the first aspect, explanations thereof are omitted.

The control means of the second aspect owns such a different point from the control means of the first aspect. That is, the control means sets the output voltage of the relative direction detecting means as the central point potential in the case that the voltage judging means continuously judges that the first output voltage is made coincident with the second output voltage within the predetermined error range during a time duration longer than predetermined time. The judging means for judging as to whether or not the respective output voltages are continuously made coincident with each other during the time duration longer than the predetermined time is arranged by a counter circuit for counting times at which the analog comparator corresponding to the above-explained voltage judging means continuously judges that the difference voltage is lower than, or equal to a preselected voltage, and a digital comparator for comparing the count value of this counter circuit with a reference value. Then, when this count value is larger than, or equal to the reference value, this judging means judges that the first output voltage is made coincident with the second output voltage during the time period longer than the preselected time.

As a consequence, in accordance with the vehicle direction correcting apparatus of the second aspect of the present invention, since the control means sets the output voltage of the relative direction detecting means as the central point potential in the case that the voltage judging means continuously judges that the first output voltage is made coincident with the second output voltage within the predetermined error range during a time duration longer than predetermined time, the vehicle direction correcting apparatus can correct the output voltage of the relative direction detecting means based upon this central point potential in the output voltage of the relative direction detecting means for detecting direction of the vehicle in such a manner that the drift error contained in the output voltage is eliminated, as compared with the vehicle direction correcting apparatus of the first aspect.

BRIEF DESCRIPTION OF THE DRAWINGS

FIGS. 3A to 3D are explanatory diagrams for indicating input signals and output signals appearing in the respective circuit arrangements (analog comparator, counter circuit, digital comparator, and latch circuit) employed in the vehicle direction correcting unit according to this embodiment;

DETAILED DESCRIPTION OF THE PREFERRED EMBODIMENTS

Figure 1:
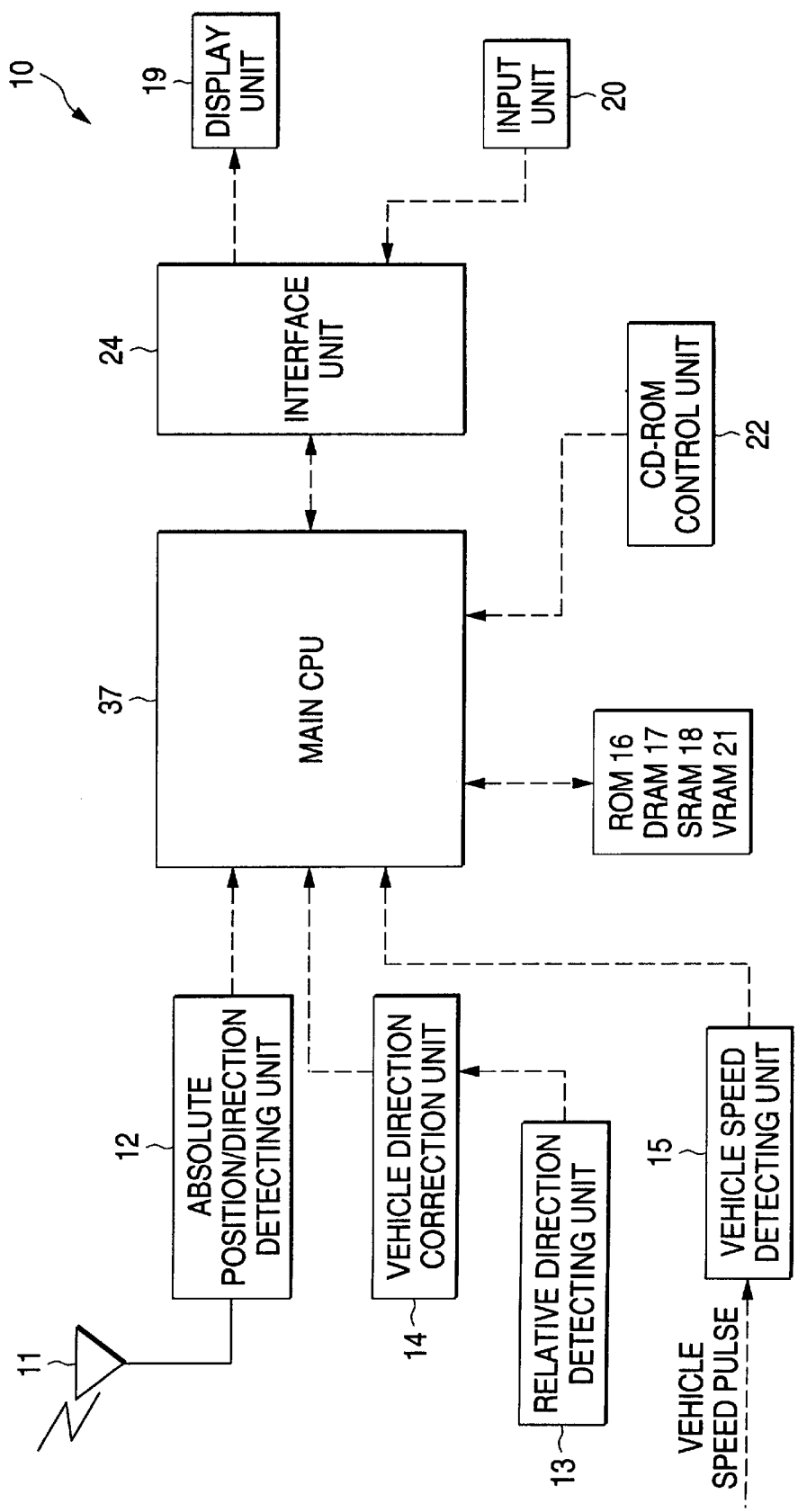
FIG. 1 is a block diagram for schematically showing an internal arrangement of a navigation system of a vehicle direction correcting apparatus, according to an embodiment of the present invention.
Figure 2:
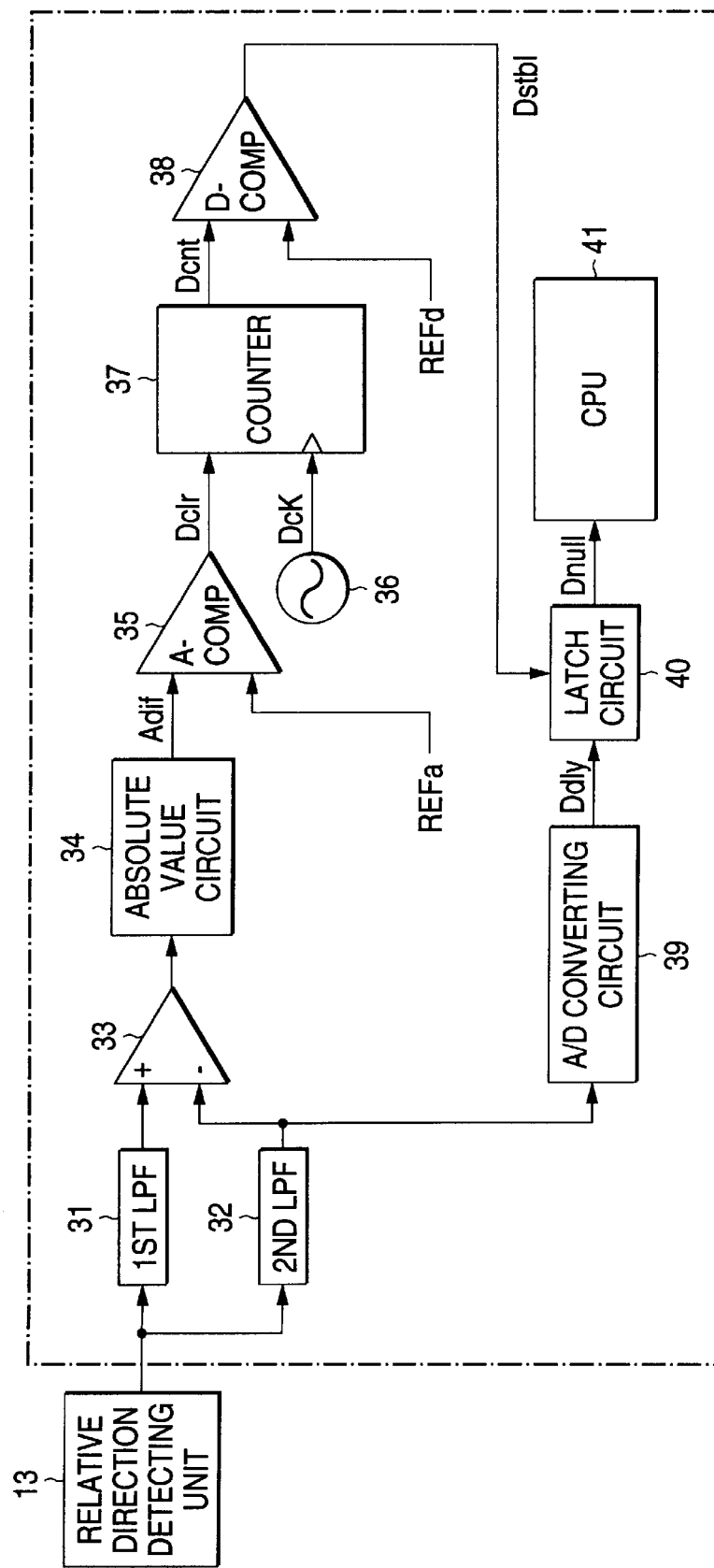
FIG. 2 is a block diagram for schematically representing an internal arrangement of a vehicle direction correcting unit for constituting a major portion of the navigation system according to the embodiment.

Referring now to drawings, a navigation system of a vehicle direction correcting apparatus according to an embodiment of the present invention will be described. FIG. 1 is a schematic block diagram for representing an internal arrangement of a navigation system according to this preferred embodiment. FIG. 2 is a schematic block diagram for showing an internal arrangement of a vehicle direction correcting unit functioning as a major unit of the navigation system according to this embodiment.

The navigation system 10 indicated in FIG. 1 comprises a communication antenna 11 for receiving data related to a GPS (Global Positioning System) satellite and an own vehicle position; an absolute position/direction detecting unit 12 for detecting the own vehicle position and drive direction, such as an absolute position and direction of the GPS system based on the data acquired via this communication antenna 11; and a relative direction detecting unit 13 for detecting the drive direction of the vehicle based upon an angular velocity of this vehicle, for example, an angular velocity sensor. This navigator system 10 further comprises a vehicle direction correcting unit 14 for correcting a drift error contained in an output voltage from the relative direction detecting unit 13 so as to reduce this drift error to zero; a vehicle speed detecting unit 15 for detecting a vehicle speed change amount in response to a vehicle speed pulse of a vehicle, for example, a vehicle speed sensor; a ROM (Read-only Memory) 16 for previously recording a basic program of the overall navigation system 10; and a DRAM (Dynamic RAM) 17 for storing a main program. This navigation system further comprises an SRAM (Static RAM) 18 for saving various data as a back-up memory; a display unit 19 for displaying various data about map information and a menu; an input unit 20 for inputting various information; a VRAM (Video RAM) 21 for temporarily storing display data; a CD-ROM control unit 22 for reading map data and the like recorded on a CD-ROM (Compact Disk-ROM); a main CPU 23 for controlling the entire system of this navigation system 10; and an interface unit 24 for interfacing the above-explained input unit 20, display unit 19, and main CPU 23.

As indicated in FIG. 2, the above-explained vehicle direction correcting unit 14 contains a first LPF (low-pass filter) 31, a second LPF 32, a subtracter 33, an absolute value circuit 34, an analog comparator 35, a counter circuit 37, a digital comparator 38, an A/D (analog-to-digital) converting circuit 39, a latch circuit 40, and a CPU 41. The first LPF 31 passes therethrough a low-frequency component contained in an output voltage derived from the relative direction detecting unit 13, so that a first output voltage is produced. The second LPF 32 has a different delay time from that of the first LPF 31, and passes therethrough a low-frequency component contained in the output voltage derived from the relative direction detecting unit 13, so that a second output voltage is produced. The subtracter 33 subtracts the second output voltage of the second LPF 32 from the first output voltage of the first LPF 31 to produce a difference voltage. The absolute value circuit 34 processes the difference voltage of this subtracter to obtain an absolute voltage of this processed difference voltage. The analog comparator 35 compares the difference voltage "Adif" obtained from this absolute value circuit 34 with a reference voltage "REFa" to thereby produce a first comparison result signal "Dclr". The counter circuit 37 produces a count value "Dcnt" in response to the first comparison result signal Dclr obtained from the analog comparator 35 and a count signal Dck outputted from an oscillator 36. The digital comparator 38 compares the count value Dcnt outputted from this counter circuit 37 with another reference value "REFd" to produce a second comparison result signal "Dstbl". The A/D converting circuit 39 A/D-converts the second output voltage derived from the second LPF 32 into a digital potential signal "Ddly". The latch circuit 40 controls outputting of this digital potential signal Ddly based on the second comparison result signal Dstbl derived from the digital comparator 38. The CPU 41 executes a correcting operation in such a manner that while a digital potential signal Dnull outputted from this latch circuit 40 is used as a central point potential for the relative direction detecting unit 13, a drift error contained in the output voltage of this relative direction detecting unit 13 is eliminated based on this central point potential.

Next, a description will now be made of operations of the navigation system 10 according to this embodiment, especially operation of the vehicle direction correcting unit 14.

The relative direction detecting unit 13 supplies the output voltage obtained therefrom to the first LPF 31 and the second LPF 32, respectively. The first LPF 31 passes therethrough the output voltage of this relative direction detecting unit 13 to thereby produce a first output voltage, and then supplies this first output voltage to one of the subtracter 33.

The second LPF 32 passes therethrough a low-frequency component contained in the output voltage derived from the relative direction detecting unit 13 to thereby produce a second output voltage, and thus supplies this second output voltage to the other input of the subtracter 33. This subtracter 33 subtracts the second output voltage of the second LPF 32 from the first output voltage of the first LPF 31 to obtain a difference voltage, and then supplies this difference voltage to the absolute value circuit 34.

This absolute value circuit 34 processes the difference voltage outputted from the subtracter 33 to produce an absolute value, i.e., a difference voltage "Adif", and then supplies this difference voltage Adif to one input of the analog comparator 35.

On the other hand, a predetermined reference voltage REFa is entered into the other input of this analog comparator 35. Then, the analog comparator 35 compares the difference voltage (absolute value) Adif with the predetermined reference voltage REFa to obtain a comparison result, and then furnishes a first comparison result signal Dclr having a HIGH level, or a LOW level to the counter circuit 37 based upon this comparison result.

As indicated in FIG. 3A, it should be noted that if the difference voltage (absolute value) Adif is lower than, or equal to the reference voltage REFa, then the analog comparator 35 may judge as a comparison result that a potential difference between the first output voltage of the first LPF 31 and the second output voltage of the second LPF 32 becomes small, and thus supplies the first comparison result signal Dclr having the LOW level to the counter circuit 37. Also, if the difference voltage (absolute value) Adif exceeds the reference voltage REFa, then the analog comparator 35 may judge as a comparison result that a potential difference between the first output voltage of the first LPF 31 and the second output voltage of the second LPF 32 becomes large, and thus supplies the first comparison result signal Dclr having the HIGH level to the counter circuit 37.

As one input, the first comparison result signal Dclr is entered into this counter circuit 37, whereas as the other input, the count signal Dck derived from the oscillator 36 is entered thereto, so that a count value "Dcnt" is supplied from this counter circuit 37 to the digital comparator 38.

Also, as represented in FIG. 3B, if the first comparison result signal Dclr has a HIGH level, then this counter circuit 37 supplies the count value Dcnt of "0" to the digital comparator 38. If the first comparison result signal Dclr has a LOW level, then the count value of this counter circuit 37 is incremented every time the first comparison result signal Dclr having the LOW level is inputted. The incremented count value Dcnt is supplied to the digital comparator 38.

On the other hand, a predetermined reference value REFd is entered into the other input of this digital comparator 38. Then, the digital comparator 38 compares the count value Dcnt of the counter circuit 37 with the preselected reference value REFd to obtain a comparison result, and then furnishes a second comparison result signal Dstbl having a HIGH level, or a LOW level to the latch circuit 40 based upon this comparison result.

As indicated in FIG. 3C, it should be noted that if the count value Dcnt of the counter circuit 37 is larger than the reference value REFd, then the digital comparator 38 supplies the second comparison result signal Dstl having the HIGH level to the latch circuit 40. Also, if the count value Dcnt of the counter circuit 37 is smaller than, or equal to the predetermined reference value REFd, then this digital comparator 38 supplies the second comparison result signal Dstbl having the LOW level to the latch circuit 40.

Also, as previously described, the second LPF 32 applies the second output voltage to the other input of the subtracter 33, and further applies this second output voltage to the A/D converting circuit 39. This A/D converting circuit 39 A/D-converts this second output voltage into the digital potential signal Ddly and supplies this digital potential signal Ddly to the latch circuit 40.

This latch circuit 40 controls outputting of the digital potential signal Ddly to the CPU 41 based on the second comparison result signal Dstbl supplied from the digital comparator 38.

As indicated in FIG. 3D, in this latch circuit 40, when the second comparison result signal Dstbl of the digital comparator 38 becomes a HIGH level, the digital potential signal Ddly is directly supplied as the digital potential signal Dnull to the CPU 41, whereas when the second comparison result signal Dstbl becomes a LOW level, the digital potential signal Ddly supplied immediately before is stored/held.

This CPU 41 recognizes the digital potential signal Ddly derived from the latch circuit 40 as the central point potential of the relative direction detecting unit 13, and then corrects the output voltage derived from the relative direction detecting unit 13 based on this central point potential in order that the drift error of the output voltage is reduced to zero.

Figure 4:
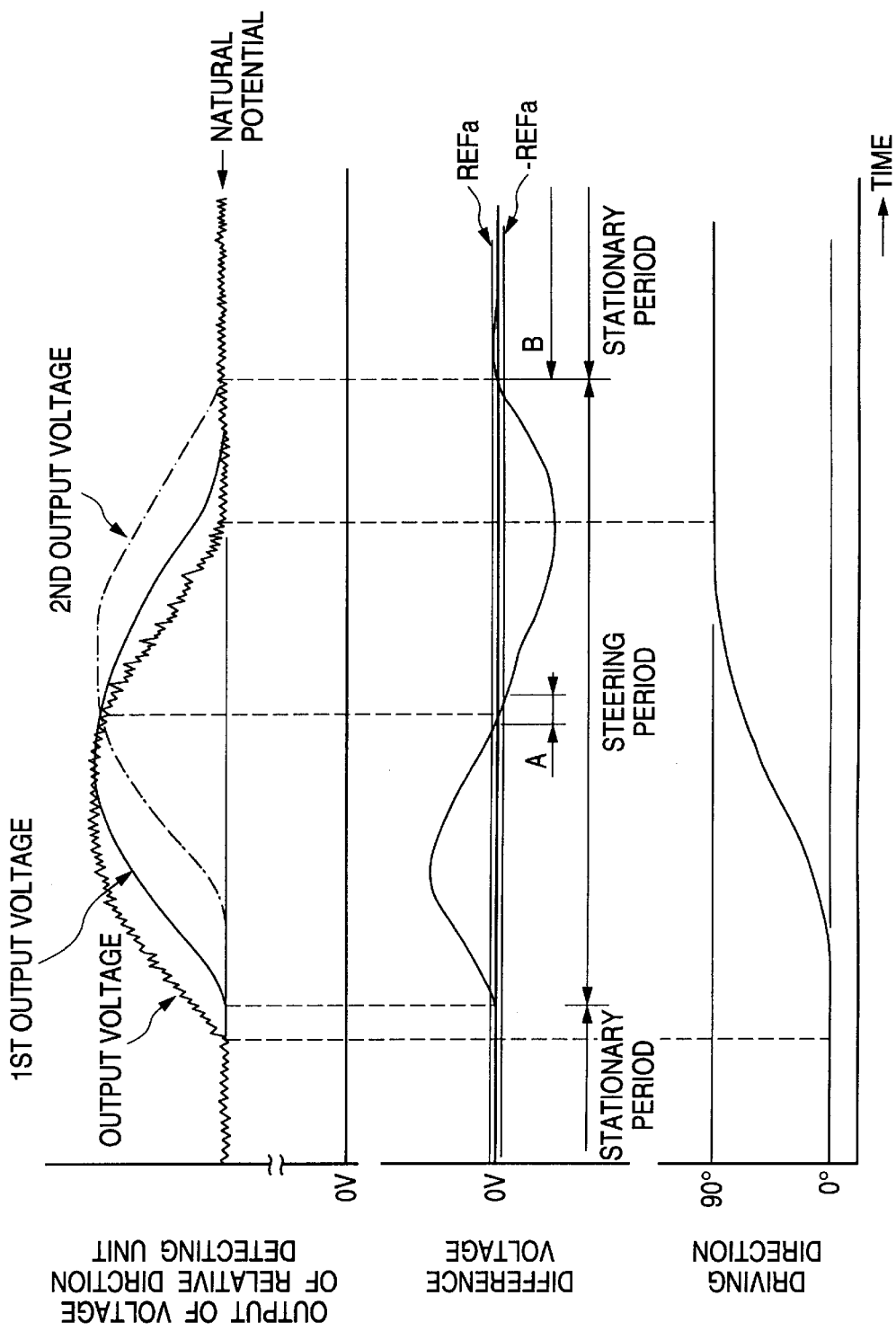
FIG. 4 is a timing chart for indicating operations of the vehicle direction correcting unit for acquiring a central point potential of an angular velocity sensor, according to the embodiment.
Figure 5:
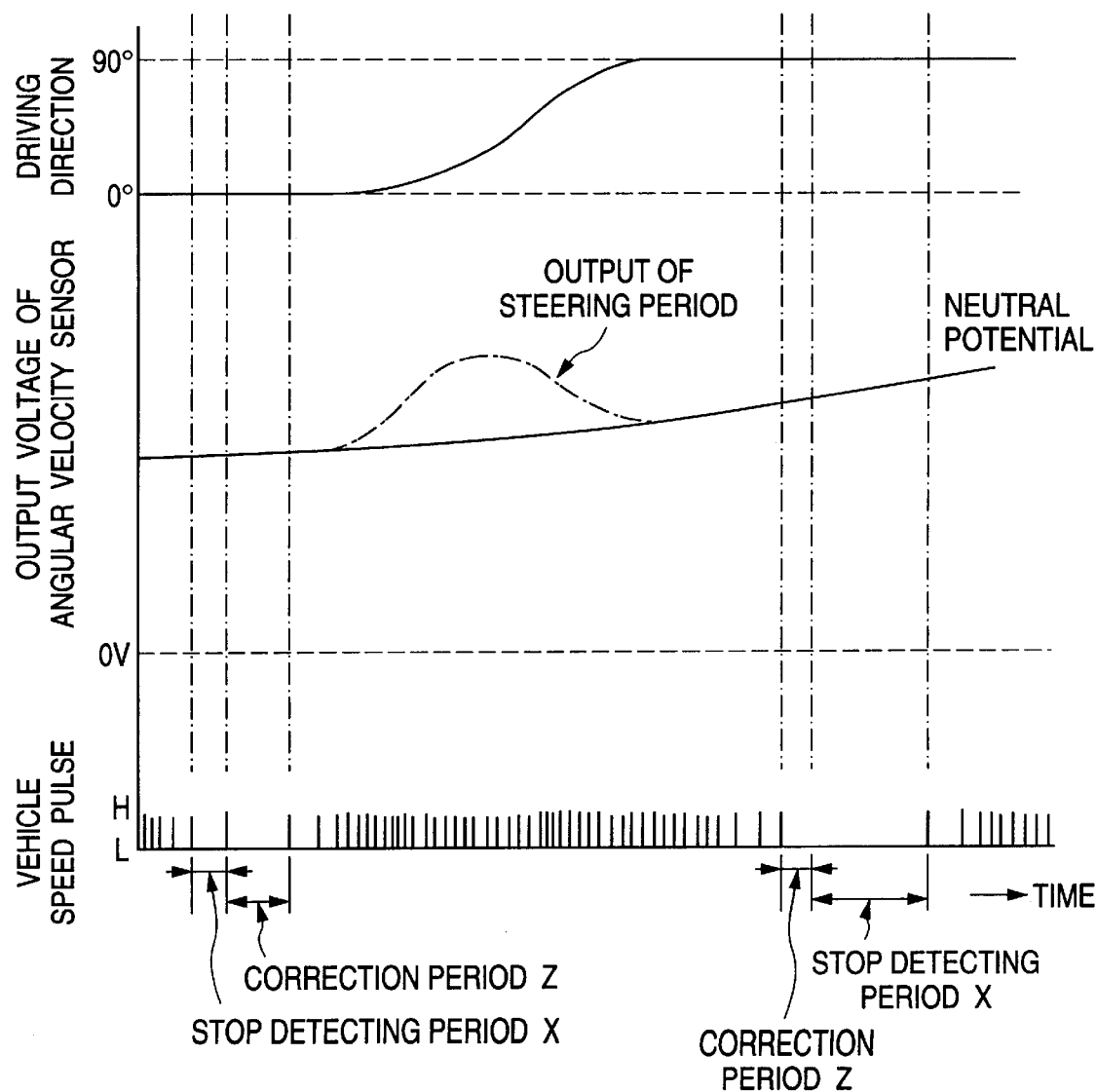
FIG. 5 is a timing chart for representing the operations of the conventional vehicle direction correcting apparatus for acquiring the central point potential of the angular velocity sensor.

Referring now to a timing chart, operations of the vehicle direction correcting unit 14 will be explained in detail. FIG. 4 is a timing chart for representing the operations of the vehicle direction correcting unit 14 in order to acquire the central point potential of the relative direction detecting unit 13 in accordance with this embodiment.

While paying an attention to a chart of the output voltage from the relative direction detecting unit 13 in FIG. 4, when the vehicle is driven, or traveled under normal condition, the output voltage of this relative direction detecting unit 13 is continuously changed in response to the drive direction of the vehicle. Since the delay time of the first LPF 31 is different from the delay time of the second LPF 32 in the vehicle direction correcting unit 14, the output voltages from these first and second LPF 31 and 32 have a phase difference.

As a consequence, as readily understood from the output voltages of the relative direction detecting unit 13 shown in FIG. 4, when the first output voltage of the first LPF 31 is made coincident with the second output voltage of the second LPF32, the change in the output voltage of the relative direction detecting unit 13 is limited only to a very small.

In other words, if a detection is made of such a time period that the potential difference between the first output voltage of the first LPF 31 and the second output voltage of the second LPF 32 is small, namely the first output voltage is made coincident with the second output voltage, then it is possible to recognize a stationary time period "B" corresponding to a time duration during which the vehicle is stopped.

The following risk may happen to occur. That is, as indicated in a time period "A" of FIG. 4, a potential difference between the first output voltage of the first LPF 31 and the second output voltage of the second LPF 32 becomes small, and then the first output voltage will be made coincident with the second output voltage irrespective of a steering time period during which the vehicle is not stopped, namely the drive direction of the vehicle is changed.

To judge such a time period A, the reference value REFd of the digital comparator 38 is previously adjusted. When the count value Dcnt is made coincident with the reference value REFd in this digital comparator 38, this time period A may be judged.

It should also be noted that during the stationary time period of the vehicle, the second comparison result signal Dstbl of the digital comparator 38 becomes a HIGH level, and a digital potential signal Dnull (Ddly) functioning as the A/D-converted value of the second LPF 32 is supplied to the CPU 41.

Also, during the steering time period of the vehicle, the second comparison result signal Dstbl of the digital comparator 38 becomes a LOW level, a digital potential signal Dnull (Ddly) functioning as the A/D-converted value of the second LPF 32 is held by the latch circuit 40, and when the second comparison signal becomes a HIGH level, this digital potential signal Ddly (Dnull) under holding state is supplied to the CPU 41.

In accordance with this embodiment, the first comparison result signal Dclr having the LOW level is outputted from the analog comparator 35, which is judged by such that the difference voltage between the first output voltage and the second output voltage is lower than the reference voltage. Furthermore, when the count value Dcnt of the first comparison result signal Dclr having the LOW level becomes larger than, or equal to the reference value REFd in the digital comparator 38, the output voltage of the relative direction detecting unit 13, corresponding to the second output voltage is set as the central point potential. Then, based upon this central point potential, the output voltage of the relative direction detecting unit 13 is corrected in such a manner that the drift error contained in the output voltage of this relative direction detecting unit 13 is eliminated. As a consequence, the output voltage derived from the relative direction detecting unit 13 can be surely corrected by employing only this relative direction detecting unit 13 in such a manner that the drift error contained in this output voltage can be eliminated without utilizing various appliances other than the relative direction detecting unit 13 used in the navigation system, for example, the absolute position/direction detecting unit 12, the vehicle speed detecting unit 15, and the CD-ROM control unit 22. Furthermore, the actual vehicle drive direction can be surely recognized.

It should also be understood that in the above-described embodiment, the output voltage of the relative direction detecting unit 13 is corrected in such a manner that the drift error contained in this output voltage is eliminated by employing only such a relative direction detecting unit 13. As a result, the vehicle drive direction can be surely recognized. Alternatively, if the above-explained absolute value/direction detecting unit 12, vehicle speed detecting unit 15, and CD-ROM control unit 22 are utilized, then the vehicle drive direction may be further firmly recognized.

In accordance with the vehicle direction correcting apparatus with employment of the above-described arrangement, as defined in the first aspect, since the control means sets the output voltage of the relative direction detecting means as the central point potential in the case that the voltage judging means judges that the first output voltage is made coincident with the second output voltage within the predetermined error range, the vehicle direction correcting apparatus can correct the output voltage of the relative direction detecting means based upon the central point potential in the output voltage of the relative direction detecting means for detecting direction of the vehicle in such a manner that the drift error contained in the output voltage is eliminated. As a consequence, the output voltage derived from the relative direction detecting unit can be surely corrected by employing only this relative direction detecting unit in such a manner that the drift error contained in this output voltage can be eliminated without utilizing various appliances other than the angular velocity sensor, i.e., the relative direction detecting unit used in the navigation system, for example, the GPS, the vehicle speed sensor, and the CD-ROM. Furthermore, the actual vehicle drive direction can be surely recognized.

Also, in accordance with the vehicle direction correcting apparatus, as defined in the second aspect, since the control means sets the output voltage of the relative direction detecting means as the central point potential in the case that the voltage judging means continuously judges that the first output voltage is made coincident with the second output voltage within the predetermined error range during a time duration longer than predetermined time, the vehicle direction correcting apparatus can correct the output voltage of the relative direction detecting means based upon this central point potential in the output voltage of the relative direction detecting means for detecting direction of the vehicle in such a manner that the drift error contained in the output voltage is eliminated, as compared with the effect of the first aspect.

What is claimed is:

1. A vehicle direction correcting apparatus for correcting an output voltage of relative direction detecting means based upon a central point potential in the output voltage of said relative direction detecting means for detecting direction of a vehicle in such a manner that a drift error contained in said output voltage is eliminated, said apparatus comprising:

first filter means for passing therethrough a low frequency component contained in the output voltage of said relative direction detecting means to thereby produce a first output voltage;

second filter means having delay time different from that of said first filter means, for passing therethrough a low frequency component contained in the output voltage of said relative direction detecting means to thereby produce a second output voltage;

voltage judging means for judging as to whether or not said first output voltage of the first filter means is made coincident with said second output voltage of the second filter means within a predetermined error range; and control means for setting an output voltage of said relative direction detecting means as the central point potential in the case that said voltage judging means judges that said first output voltage is made coincident with said second output voltage within said predetermined error range.

2. A vehicle direction correcting apparatus as claimed in claim 1, wherein said control means sets an output voltage of said relative direction detecting means as the central point potential in the case that said voltage judging means continuously judges that said first output voltage is made coincident with said second output voltage within said predetermined error range during a time duration longer than predetermined time.

3. A vehicle direction correcting apparatus as claimed in claim 2, wherein said voltage judging means calculates a difference between said first output voltage and said second output voltage, and judges as to whether or not said difference exceeds a preselected value.

4. A vehicle direction correcting apparatus as claimed in claim 3 wherein said control means includes means for latching the output voltage of said relative direction detecting means.

5. A vehicle direction correcting apparatus as claimed in claim 1, wherein control means sets an output voltage of said relative direction detecting means as the central point potential in the case that said voltage judging means judges that said first output voltage is made coincident with said second output voltage within said predetermined error range, and also sets an output voltage of said relative direction detecting means as the central point potential, which is acquired immediately before such a judgment, in the case that said first output voltage is not made coincident with said second output voltage within said predetermined error range.

6. A vehicle direction correcting apparatus as claimed in claim 5, wherein said voltage judging means calculates a difference between said first output voltage and said second output voltage, and judges as to whether or not said difference exceeds a preselected value.

7. A vehicle direction correcting apparatus as claimed in claim 6, wherein said control means includes means for latching the output voltage of said relative direction detecting means.

8. A vehicle direction correcting apparatus as claimed in claim 1, wherein said voltage judging means calculates a difference between said first output voltage and said second output voltage, and judges as to whether or not said difference exceeds a preselected value.

9. A vehicle direction correcting apparatus as claimed in claim 8 wherein said control means includes means for latching the output voltage of said relative direction detecting means.

* * * * *